US007313726B2

(12) United States Patent
Shen et al.

(10) Patent No.: US 7,313,726 B2
(45) Date of Patent: *Dec. 25, 2007

(54) OPERATING SYSTEM AND DATA PROTECTION

(75) Inventors: Andrew W. Shen, Dallas, TX (US); Hanxiang Sun, Vista, CA (US); Zhang Jian, Nanjing (CN)

(73) Assignee: Idocrase Investments LLC, Las Vegas, NV (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/920,824

(22) Filed: Aug. 18, 2004

(65) Prior Publication Data

US 2005/0015559 A1   Jan. 20, 2005

Related U.S. Application Data

(63) Continuation of application No. 10/437,880, filed on May 13, 2003, now Pat. No. 6,802,029, which is a continuation of application No. 09/420,348, filed on Oct. 19, 1999, now Pat. No. 6,594,780.

(51) Int. Cl.
    *G06F 11/00* (2006.01)
(52) U.S. Cl. ............................................ 714/15; 714/19
(58) Field of Classification Search .................. 711/163
    See application file for complete search history.

(56) References Cited

U.S. PATENT DOCUMENTS 3,845,425 A * 10/1974 Clements et al. ............ 711/152
4,746,998 A * 5/1988 Robinson et al. ........... 360/72.1
5,089,958 A * 2/1992 Horton et al. .................. 714/5
6,016,553 A * 1/2000 Schneider et al. ............ 714/21
6,092,161 A * 7/2000 White et al. ................ 711/163
6,192,488 B1 * 2/2001 Li ................................ 714/15
6,286,113 B1 * 9/2001 Sembach et al. ............. 714/15
6,374,268 B1 * 4/2002 Testardi ...................... 707/205
6,510,552 B1 * 1/2003 Benayoun et al. ........... 717/170
6,795,833 B1 * 9/2004 Whipple, II ................. 707/204
2002/0023199 A1 * 2/2002 Biessener et al. ............ 711/162

OTHER PUBLICATIONS

Microsoft Press Computer Dictionary Third Edition, "BIOS", Microsoft Press, 1997, p. 51.*
Rosenblum et al., "The Design and Implementation of a Log-Structured File System", 1991, ACM.*
Microsoft Press Computer Dictionary Third Edition, "write protect", Microsoft Press, 1997, p. 513.*

* cited by examiner

*Primary Examiner*—Gabriel Chu (57) ABSTRACT

The disclosed systems and methods provide for the protection of protected memory, for example, a hard disk, in a computer system. The systems and methods are configured to re-direct read and write access commands from locations in the protected memory to alternative storage locations. The systems and methods provide the ability for the user to accept or reject any BIOS changes that are to be made to the computing system. In addition, the systems and methods protect against operating system crash due to missing or corrupted files. The systems and methods are additionally operable to recover mistakenly deleted or damaged application data from a hard disk level, as well as to protect the operating system and data of the computing system against virus penetration. In other embodiments, the systems and methods are operable to provide for a security lock to the computing system and its associated data.

58 Claims, 8 Drawing Sheets

Fig. 3
Program Flow

Fig. 4A
Attempted Disk Access Operations

Fig. 4B
Calculation and Re-direction of Virtual Device Driver (VXD)

OPERATING SYSTEM AND DATA PROTECTION

RELATED APPLICATIONS

This application is a continuation application of, and claims priority to, U.S. patent application Ser. No. 10/437,880, filed May 13, 2003 now U.S. Pat. No. 6,802,029, which is a continuation of U.S. patent application Ser. No. 09/420,348, filed Oct. 19, 1999 now U.S. Pat. No. 6,594,780, by Shen et al., and titled "OPERATING SYSTEM AND DATA PROTECTION," both of which are incorporated by reference herein in their entirety.

BACKGROUND OF THE INVENTION

1. Field of the Invention

The present invention relates generally to computing systems; and, more particularly, it relates to protection of operating systems and application data within computing systems.

2. Description of the Related Technology

Conventional programs and methods that seek to provide for disk protection and recovery of a computing system are intrinsically available to a user of the computing system. Such conventional programs and methods are installed by a user of the computing system and are easily available to the user. Sometimes, the user performs some modification of the actual conventional program or method that itself seeks to prevent catastrophic operating system failure of the computing system and to recover the operating system of the computing system after some hard disk crash. Examples of instances where a user performs some undesirable modification of the operating system of the computing system that disables the computing system and prevents its operation.

Moreover, when the program or method that is used to prevent this collapse of the operating system of the computing system is easily visible or accessible to the user of the computing system, that program or method can itself be undesirably corrupted by the user. For example, when a user desires to "clean up" certain portions of the hard disk of the computing system, the user oftentimes goes through and deletes certain files within the hard disk without a great deal of caution or care. Such an instance would be a user-generated completion to the operating system of the computing system. The inherent installation of conventional programs and methods that seek to provide for disk protection and recovery, in that they are easily available or accessible to the user of the computing system, may themselves be corrupted by the very user of the computing system whose computing system is meant to be "protected."

Further limitations and disadvantages of conventional and traditional systems will become apparent to one of skill in the art through comparison of such systems with the present invention as set forth in the remainder of the present application with reference to the drawings.

SUMMARY OF CERTAIN INVENTIVE ASPECTS

Various inventive aspects can be found in an operating system and data protection system that is operable within a computing system. The operating system and data protection system contains, among other things, a computing system having a memory and an operating system. The operating system can execute a number of commands that are directed to the memory.

Certain aspects include a method of accessing data in locations of a memory in a computer system. The method comprises receiving a write access command directed to a first location, determining whether said first location is identified as protected, if said first location is identified as protected, determining a second location that is not identified as protected, re-directing the write access command to said second location, receiving a subsequent write access command directed to said first location, and re-directing said subsequent write access command to a third location that is not identified as protected.

In additional aspects, the method further comprises receiving at least one read access command directed to said first location, and re-directing said at least one read access command to said third location. Further aspects include the method wherein determining a second location that is not identified as protected further comprises determining a second location that is identified as available. Additional aspects include the method wherein said third location is identified as available.

Further aspects include the method wherein said memory is a disk drive and said locations are sectors. Additional aspects include the method wherein determining a second location that is not identified as protected further comprises determining a second location that is identified as available. Still further aspects include the method wherein said third location is identified as available. Additional aspects include the method wherein said memory is a disk drive. Certain other aspects include the method wherein said locations are sectors.

Additional aspects include a computer system for accessing data in locations of a memory in a computer system. The computer system comprises a driver configured to perform the steps as described in the various aspects of the method above.

DETAILED DESCRIPTION OF CERTAIN EMBODIMENTS

The following detailed description is directed to certain specific embodiments of the invention. However, the invention can be embodied in a multitude of different ways as defined and covered by the claims. The scope of the invention is to be determined with reference to the appended claims. In this description, reference is made to the drawings wherein like parts are designated with like numerals throughout.

Figure 1:
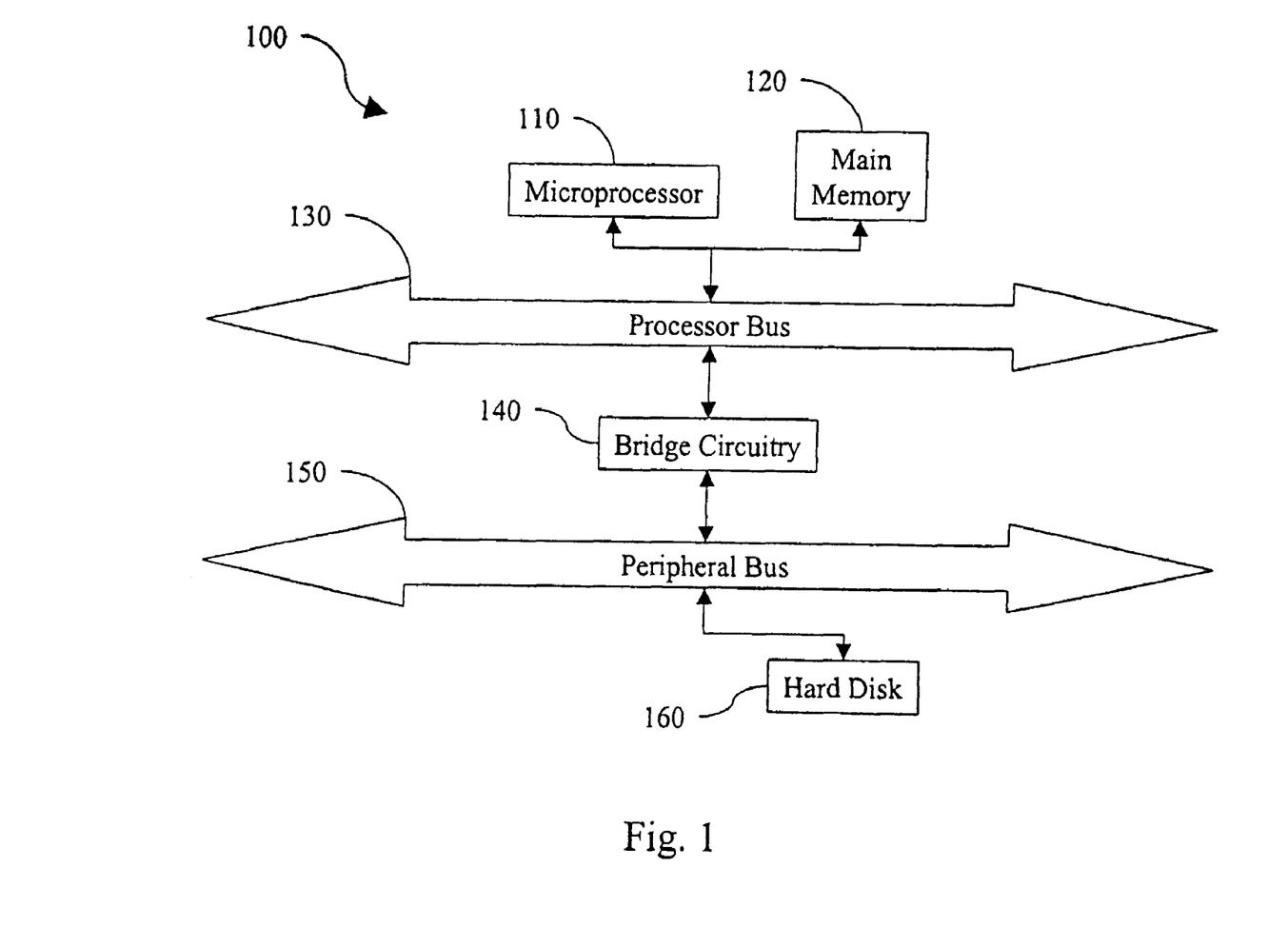
FIG. 1 is a system diagram illustrating a computing system built in accordance with the invention.

FIG. 1 is a system diagram illustrating a computing system 100 built in accordance with the invention. The computing system 100 employs a microprocessor 110 and a main memory 120 that are communicatively coupled to a processor bus 130. The processor bus 130 is communicatively coupled to a peripheral bus 150 via a bridge circuitry 140. The peripheral bus 150 communicatively couples to a hard disk 160. Any number of additional peripheral devices are communicatively coupled to the peripheral bus 150 in certain embodiments of the invention. In addition, the processor bus 130, the bridge circuitry 140, and the peripheral bus 150 compose a bus system within the computing system 100 in various embodiments of the invention. The microprocessor 110 initiates disk access commands to access the hard disk 160. The commands are passed through the processor bus 130, via the bridge circuitry 140, to the peripheral bus 150 that finally initiates the disk access commands to the hard disk 160. In various embodiments of the invention, the present invention employs a system that intercepts the disk access commands that are to be passed to the hard disk 160.

Figure 2:
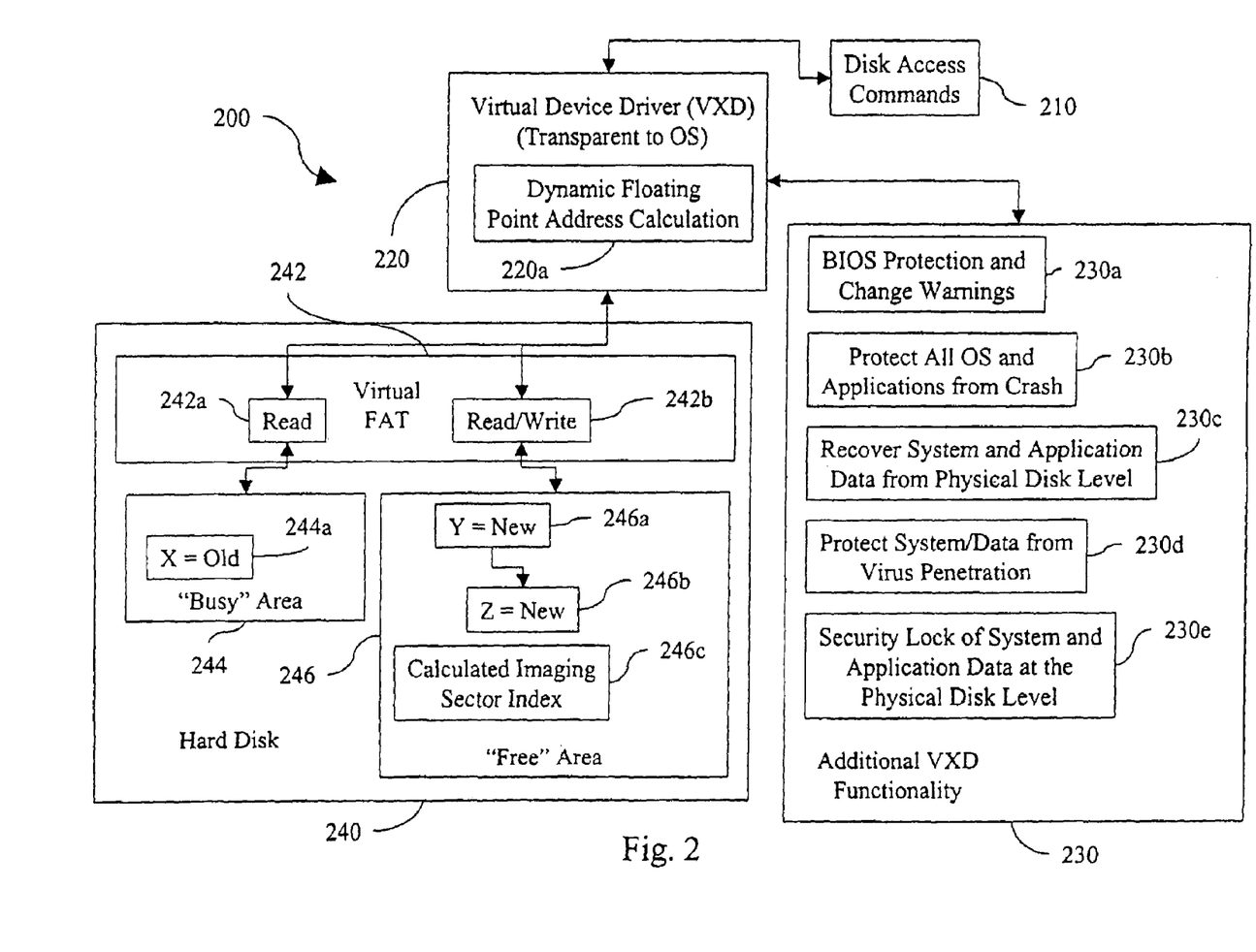
FIG. 2 is a system diagram illustrating one specific embodiment of the computing system of FIG. 1 that has a virtual device driver (VXD) that is operable in accordance with the invention.

FIG. 2 is a system diagram illustrating one specific embodiment of a computing system 200 of FIG. 1 that has a virtual device driver (VXD) 220 that is operable in accordance with the invention. The computing system 200 is operable to perform a plurality of disk access commands 210 that are directed to a hard disk 240. The virtual device driver (VXD) 220 intercepts the plurality of disk access commands 210. The virtual device driver (VXD) 220, in accordance with the invention, is transparent to an operating system of the computing system 200. That is to say, absent sophisticated techniques, a user of the computing system 200 is unable to find and modify the virtual device driver (VXD) 220 that is employed within the computing system 200. The virtual device driver (VXD) 220 itself performs, among other things, dynamic point floating address calculation 220a. In certain embodiments of the invention, the dynamic point floating address calculation 220a is used to perform calculation and re-direction of the plurality of disk access commands 210.

The virtual device driver (VXD) 220 is operable, in certain embodiments of the invention, to perform additional virtual device driver (VXD) functionality 230 in addition to the interception of the plurality of disk access commands 210 that are passed to the hard disk 240. Specific examples of the additional virtual device driver (VXD) functionality 230 include, but are not limited to, BIOS protection and change warnings 230a, protect all operating system and applications from crash 230b, recover system and application data from physical disk level 230c, protection of the system/data from virus penetration 230d, and security lock of system and application data at the physical disk level 230e. For example, any number of BIOS protection and change warnings 230a are provided to a user of the computing system 200 in certain embodiments of the invention. These BIOS protection and change warnings 230a are provided using any number of techniques including dialogue box warnings shown on a computer screen or an audible beeping warning provided to the user of the computing system 200. If desired, the security lock of system and application data at the physical disk level 230e that are provided within the additional virtual device driver (VXD) functionality 230 will either disable the computing system 200 itself or not allow any change or modification to the computing system 200 until a predetermined user of the computing system 200 enters a unique password or code that initiates the virtual device driver (VXD) 220 to enable the computing system 200 to continue operation. Other additional functionality is included within the additional virtual device driver VXD) functionality 230 in other embodiments of the invention.

The virtual device driver (VXD) 220 intercepts the plurality of disk access commands 210 as they are sent to a hard disk 240. The hard disk 240 itself contains, in accordance with the invention, a "busy" area 244 and a "free" area 246. The virtual device driver (VXD) 220 establishes a virtual file allocation table (FAT) 242 that resides within the hard disk 240. The virtual device driver (VXD) 220 re-directs any of the plurality of disk access commands 210 through the virtual file allocation table (FAT) 242 so that the "busy" area 244 remains unaffected and unchanged during any access of the hard disk 240. This particular aspect of the invention provides that a user of the computing system 200 is unable to modify a base system setting of the computing system 200. In certain embodiments of the invention, a number of base system settings of the computing system 200 are maintained without departing from the scope and spirit of the invention. In addition, the user of the computing system 200 is able to update the base system setting of the computing system 200 at various times. For example, the user is given the opportunity, in certain embodiments of the invention, to save a "new" base system setting, overriding the "old" base system setting. If desired, a number of user warnings are provided to the user of the computing system 200 before allowing the updating of the base system setting. The computing system 200 is operable in various embodiments of the invention to ensure that a "new" base system setting that is to be updated by the user is in fact operable. That is to say, certain embodiments of the invention contain additional functionality that ensures that there is no corruption or problem with the base system setting. In this embodiment of the invention, an additional level of protection is provided to the user of the computing system 200, in addition to the fact that the "old" base system setting of the computing system 200 remains unchanged.

The operation of the virtual driver (VXD) 220, from one perspective, is the implementation of the virtual file allocation table (FAT) 242 that itself controls the reading and writing disk access commands contained within the plurality of disk access commands 210. For example, within the virtual file allocation table (FAT) 242, those disk access commands of the plurality of disk access commands 210 that desire to read data from the hard disk 240, specifically from the "busy" area 242a of the hard disk 240, are permitted to do so. From certain perspectives of the invention, the "busy" area 242a of the hard disk 240 is viewed or protected as being read only. That is to say, the data or application data within the "busy" area 242a of the hard disk 240 is read but is incapable of being re-written within the same location of the hard disk.

However, those disk access commands of the plurality of disk access commands 210 that desire to write data to the hard disk 240, specifically from the "busy" area 242a of the hard disk 240, are not permitted to do so. Conventional disk access commands that perform reading and writing of a specific portion of data will commonly write the modified data over the top of the old data, within the same memory location within the hard disk 240. Instead, in accordance with the virtual device driver (VXD) 220 of the invention, any write commands that seek to write modified data over the top of old data within hard disk 240 are directed to write only to the "free" area 246 within the hard disk 240. For example, a write disk access instruction of the plurality of disk access commands 210 that seeks to write modified data to the "busy" area 244 will be directed to write the data to a "Y=New" 246a location within the "free" area 246 of the hard disk 240. Subsequently, when the "Y=New" 246a is modified at a later time, the entirety of the most recent modification is not written over the top of "Y=New" 246a location, but only the modified portion is written to a "Z=New" 246b location. In certain embodiments of the invention, the "Y=New" 246a location and the "Z=New" 246b location are viewed as a linked list of scatter/gather descriptors contained throughout the "free" area 246 of the hard disk 240. The calculated imaging sector index 246c of the hard disk 240 is contained exclusively in the "free" area 246 of the hard disk 240.

If desired, as a large number of the "Y=New" 246a location and the "Z=New" 246b location are performed throughout prolonged use of the computing system 200, reclamation of disk space within the hard disk 240 is performed. If desired, a warning or dialogue box is provided to a user of the computing system 200 to suggest that reclamation of disk space within the hard disk 240 should be performed.

Figure 3:
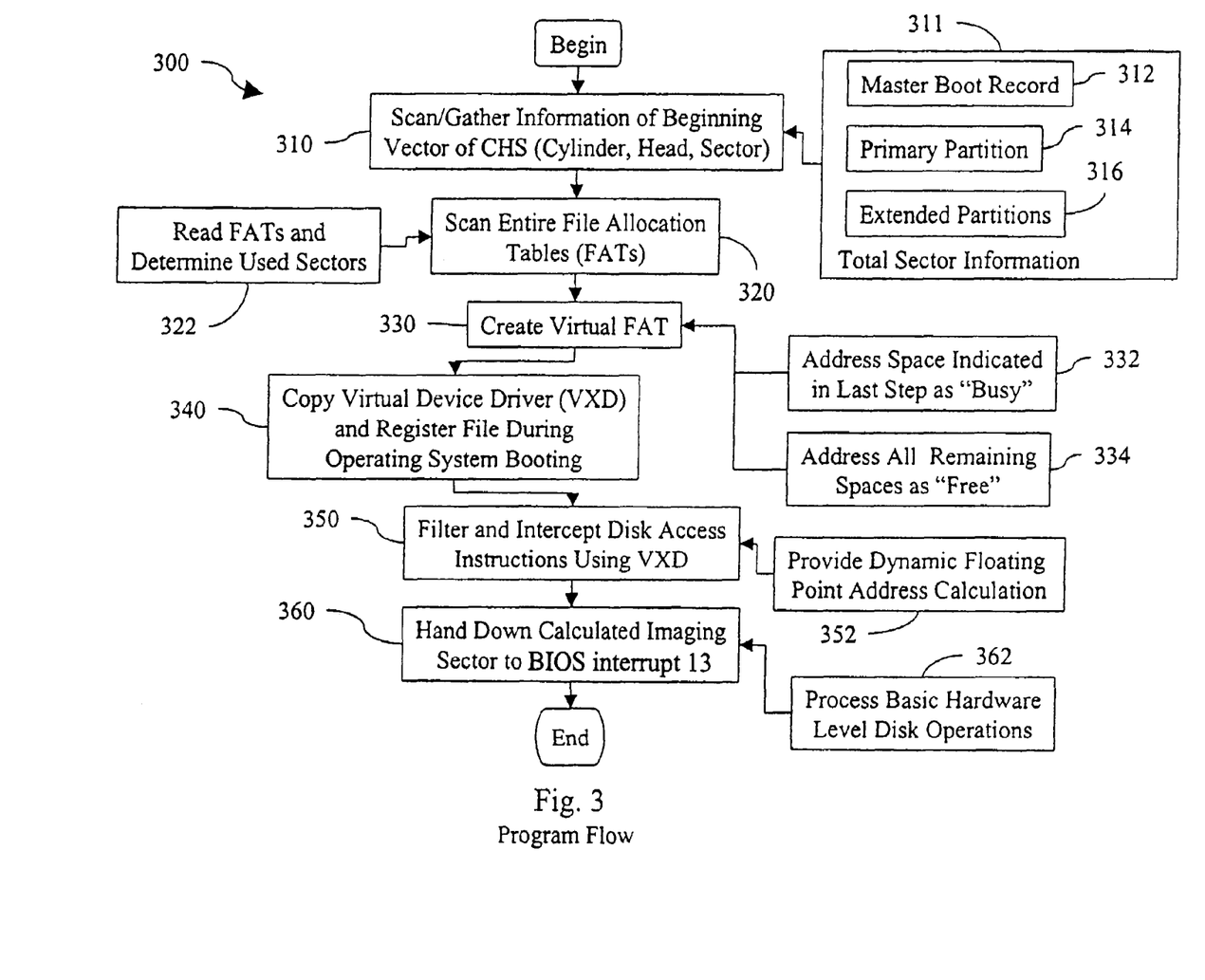
FIG. 3 is a functional block diagram illustrating a method performed in accordance with the invention that performs operating system and data program protection within a computing system.

FIG. 3 is a functional block diagram illustrating a method 300 performed in accordance with the invention that performs operating system and data program protection within a computing system. Once the program that performs the method 300 is installed within a computing system, in a block 310, the beginning vector of the hard disk of the computing system is scanned to gather the CHS (cylinder, head, sector) information of the hard disk. In addition, the total sector information of the hard disk is acquired in the block 311 in conjunction with the operation of the block 310. In the block 311, information pertaining to a master boot record 312, a primary partition 314, and a number of extended partitions 316 are all acquired in the block 311. Subsequently, in a block 320, all of the file allocation tables (FATs) of the hard disk of the computing system are scanned. Within the operation of the block 320, the file allocation tables (FATs) of the hard disk are read and the used sectors of the hard disk are determined. Many hard disks have certain corrupted or damaged sectors. These sectors are either damaged during manufacture of the hard disk, or subsequently during some damaging or catastrophic failure of the hard disk during operation of the computing system. In certain embodiments of the invention, this specific mapping of the hard disk is viewed as being a "fingerprint" of the hard disk, specific to the hard disk itself. Many conventional methods are used to determine the number of corrupted and damaged sectors within the hard disk, but the method 300 is operable to determine the specific spatial relationship of the damaged sectors within the hard disk of the computing system. This "fingerprinting" of the hard disk, as performed within the block 322 in certain embodiments of the invention, enables specific identification of the hard disk from among a number of hard disks. Additional methods are operable in accordance with the invention such as identification methods that identify a specific piece of hardware (i.e. the hard disk) of a computing system.

Subsequently, in a block 330, a virtual file allocation table (FAT) is created. If desired, in a block 332, space within the hard disk that is occupied with programs, data and other application data is determined to be "busy." In a block 334, space within the hard disk that is not occupied with programs, data and other application data is determined to be "free." Afterwards, in a block 340, the virtual device driver (VXD) is copied into the hard disk and the file is registered during operating system booting. In certain embodiments of the invention, the virtual device driver (VXD) is copied into the last portion of the computing system. During operation of the computing system, the virtual device driver (VXD) filters and intercepts disk access instructions in a block 350. In performing the operations within the block 350, dynamic floating point address calculation is performed in the block 352. This dynamic floating point address calculation is used to perform re-direction and calculation of the disk access instructions that are to be performed within the computing system. Finally, in a block 360, the calculated imaging sector to regional interrupt is handed down to a BIOS interrupt. If desired, in a block 362, the basic hardware level disk operations are performed using the BIOS interrupt of the block 360. In certain embodiments of the invention, the BIOS interrupt of the block 360 is a BIOS interrupt 13. Within the method 300, the BIOS interrupt is not performed at the original index Therefore, any disk access command will be unable to alter or damage the last update information of a base system setting that is located within the "busy" sectors of the hard disk of the computing system, as described above in other embodiments of the invention.

Figure 4A:
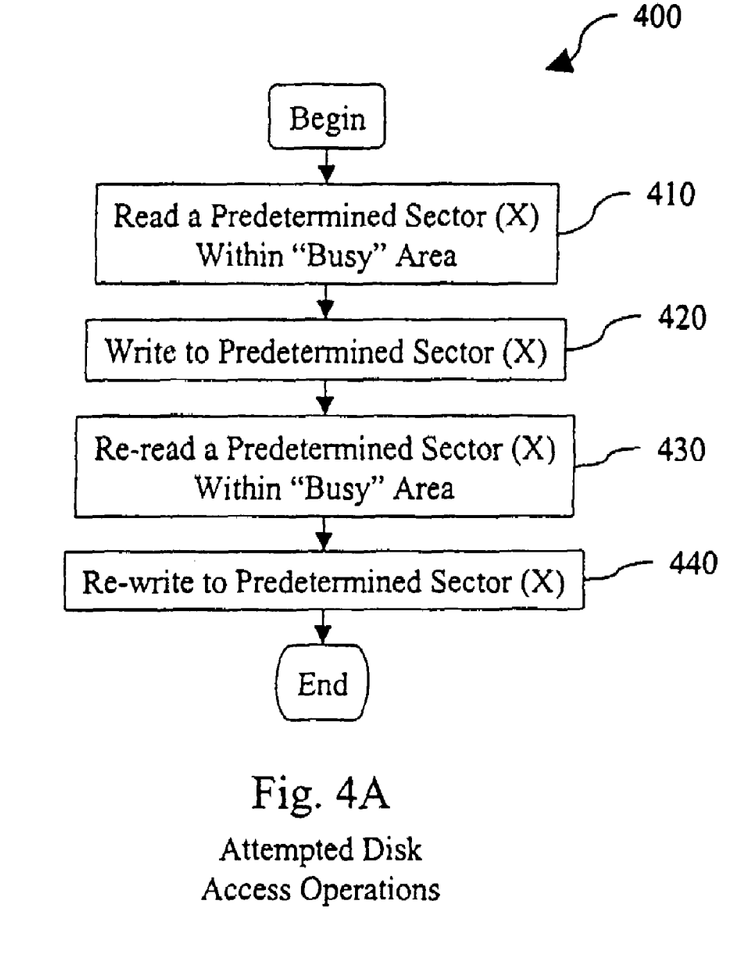
FIG. 4A is a functional block diagram illustrating a conventional method that performs disk access operations

FIG. 4A is a functional block diagram illustrating a conventional method 400 that performs disk access operations. In a block 410, a read of a "busy" area within a hard disk is performed. The "busy" area that is read is a predetermined sector (X). Then, in a block 420, a write disk access command is performed to the same predetermined sector (X). That it so say, the write operation is performed in the block 420 directly over the top of the previously performed read operation in the block 410. Subsequently, in a block 430, a re-read is performed of the same "busy" area within the hard disk. The "busy" area that is re-read in the block 430 is the same predetermined sector (X) that is read earlier in the block 410 and written in the block 430. Finally, a re-write is performed in a block 440 over the same predetermined sector (X). In each of the blocks 410, 420, 430, and 440, the same predetermined sector (X) is used. The conventional method 400 inherently does not maintain any safeguard for data or application data that are stored on a hard disk.

Figure 4B:
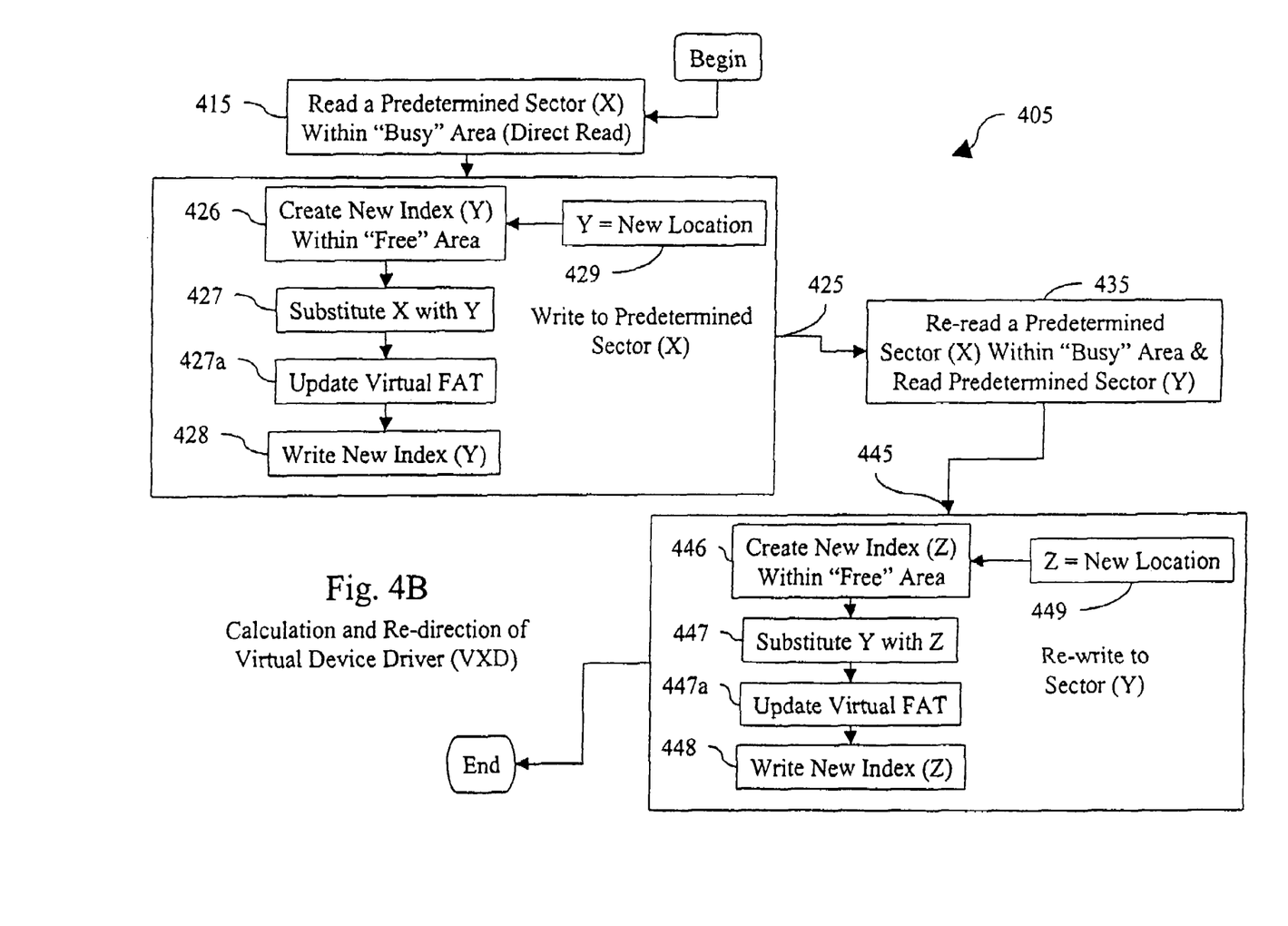
FIG. 4B is a functional block diagram illustrating a method executed in accordance with the invention that performs disk access operations using calculation and re-direction of a virtual device driver (VXD) within a computing system.

FIG. 4B is a functional block diagram illustrating a method 405 executed in accordance with the invention that performs disk access operations using calculation and re-direction of a virtual device drive (VXD) within a computing system. In a block 415, a read of a "busy" area within a hard disk is performed; this is a direct read. The "busy" area that is read is a predetermined sector (X). Then, in a block 425, a write disk access command is attempted to be performed to the same predetermined sector (X). However, within the execution of the operation within the block 425, a "Y=New Location" is defined. A new index corresponding to the "Y=New Location" is created in a block 426. The "Y=New Location" is substituted with the predetermined sector (X) in a block 427. When reading only, the predetermined sector (X) is located within a "busy" area of a hard disk of a computing system in which the method 405 is performed Conversely, when writing only, the "Y=New Location" is located within a "free" area of the hard disk of the computing system in which the method 405 is performed. The new index corresponding to the "Y=New Location" is written onto the virtual file allocation table (FAT) in a block 427*a*. Then, in a block 428, the attempted write of the block 425 into the predetermined sector (X) is actually performed by writing into a portion of the "free" area of the hard disk of the computing system; this actual writing into the "free" area of the hard disk uses the new index corresponding to the "Y=New Location"

Subsequently, in a block 435, a re-read is attempted within the predetermined sector (X) (i.e. within the "busy" area of the hard disk), but the read is actually performed using the "Y New Location" and its associated new index within the "free" area. From certain perspectives of the invention, a virtual device driver (VXD) employed in accordance with the invention performs a re-direction of a disk access command that attempts to perform a read of the predetermined sector (X). This re-direction is performed using information acquired by dynamic floating point address calculation in other embodiments of the invention.

Finally, in a block 445, a re-write to the predetermined sector (X) is attempted, but the re-write is actually performed back to the "free" area of the hard disk. First, a new index corresponding to the "Z=New Location" is created in a block 449. The "Z=New Location" is created within the "free" area of the hard disk. Subsequently, in a block 447, the "Z=New Location" is substituted with the "Y=New Location" that is generated in the block 429 above. In a block 447*a*, the virtual file allocation table (FAT) is updated to contain the substitution of the "Y=New Location" with the "Z=New Location". Finally, in a block 448, the attempted write of the block 445 into the "Y=New Location" is actually performed by writing into a portion of the "free" area of the hard disk of the computing system; this actual writing into the "free" area of the hard disk uses the new index corresponding to the "Z=New Location" that has been substituted with the "Y=New Location" in the block 447

Figure 5:
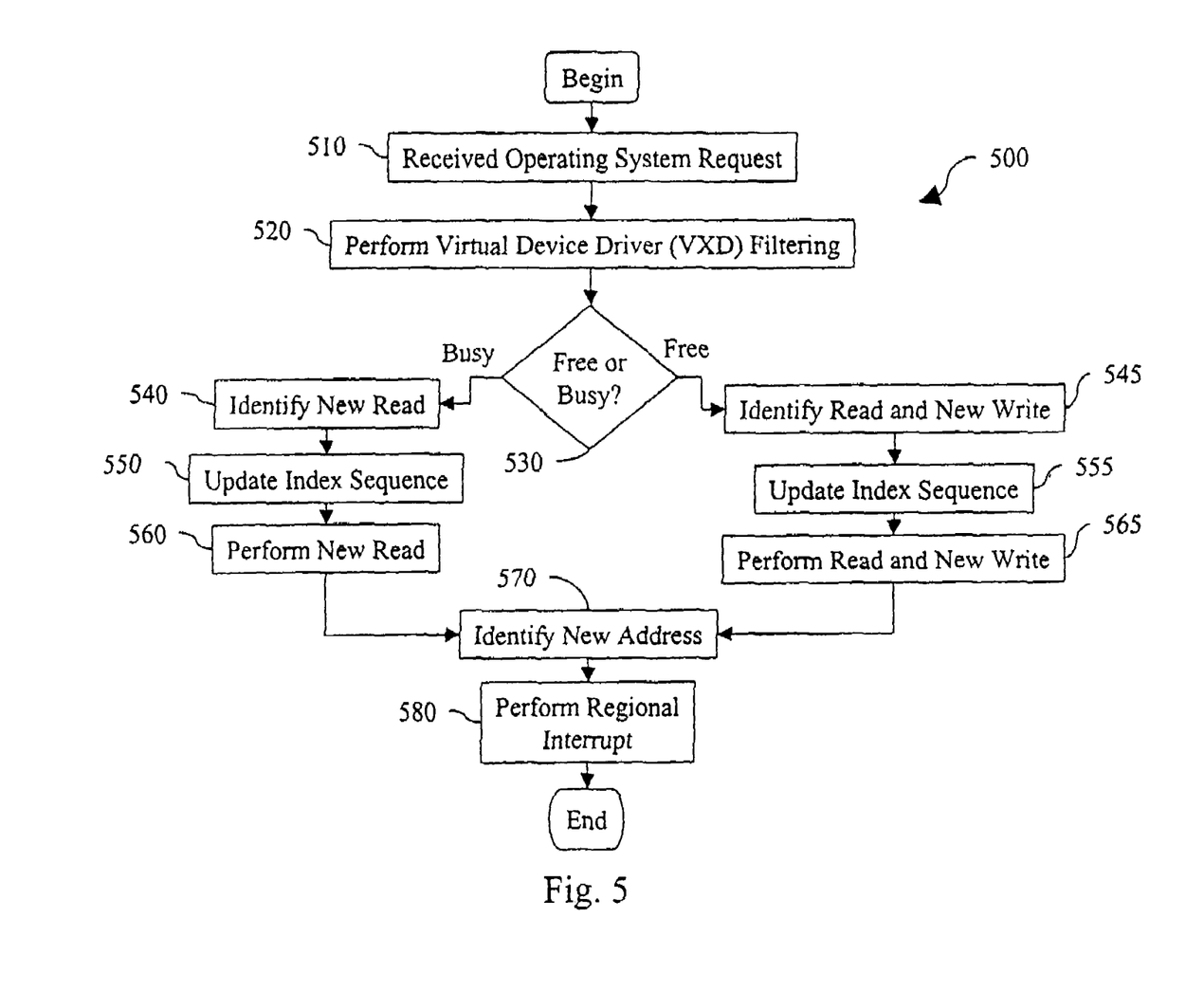
FIG. 5 is a functional block diagram illustrating one specific embodiment of the method illustrated within FIG. 4B that performs disk access operations using calculation and re-direction of a virtual device driver (VXD) within a computing system

FIG. 5 is a functional block diagram illustrating one specific embodiment of the method 500 illustrated within FIG. 4B that performs disk access operations using calculation and re-direction of a virtual device driver (VXD) within a computing system. In a block 510, an operating system request is received. Then, filtering of the operating system request is performed using a virtual device driver (VXD) in accordance with the invention in a block 520. Any of the various embodiments of the invention depicting a virtual device driver (VXD) above is employed to perform the filtering performed in the block 520 without departing from the scope and spirit of the invention. Subsequently, in a decision block 530, the disk access command or an operating system request is determined using the filtering of the block 520 if the operating system request pertains to an area of the hard disk that is "busy" or "free."

If the operating system request is to a "busy" area of the hard drive as determined in the decision block 530, then in a block 540, a new read is identified. Subsequently, in a block 550, the index sequence corresponding to the operating system request is updated. Then, a new read is performed in a block 560. Alternatively, if the operating system request is to a "free" area of the hard drive as determined in the decision block 530, then in a block 545, a read and a new write are identified. Subsequently, in a block 555, the index sequence corresponding to the operating system request is updated. Then, a read and a new write are performed in a block 565. Then, in a block 570, a new address is identified. Finally, in a block 580, a regional interrupt is performed.

The present invention is geared towards application within the Microsoft Windows 95 and Microsoft Windows 98 operating systems. The operation of the invention is amenable within additional operating systems such as Microsoft Windows NT, Linux, OS2 and other operating systems operable within various computing systems known to those having skill in the art of computing systems and their respective operating systems.

Figure 6:
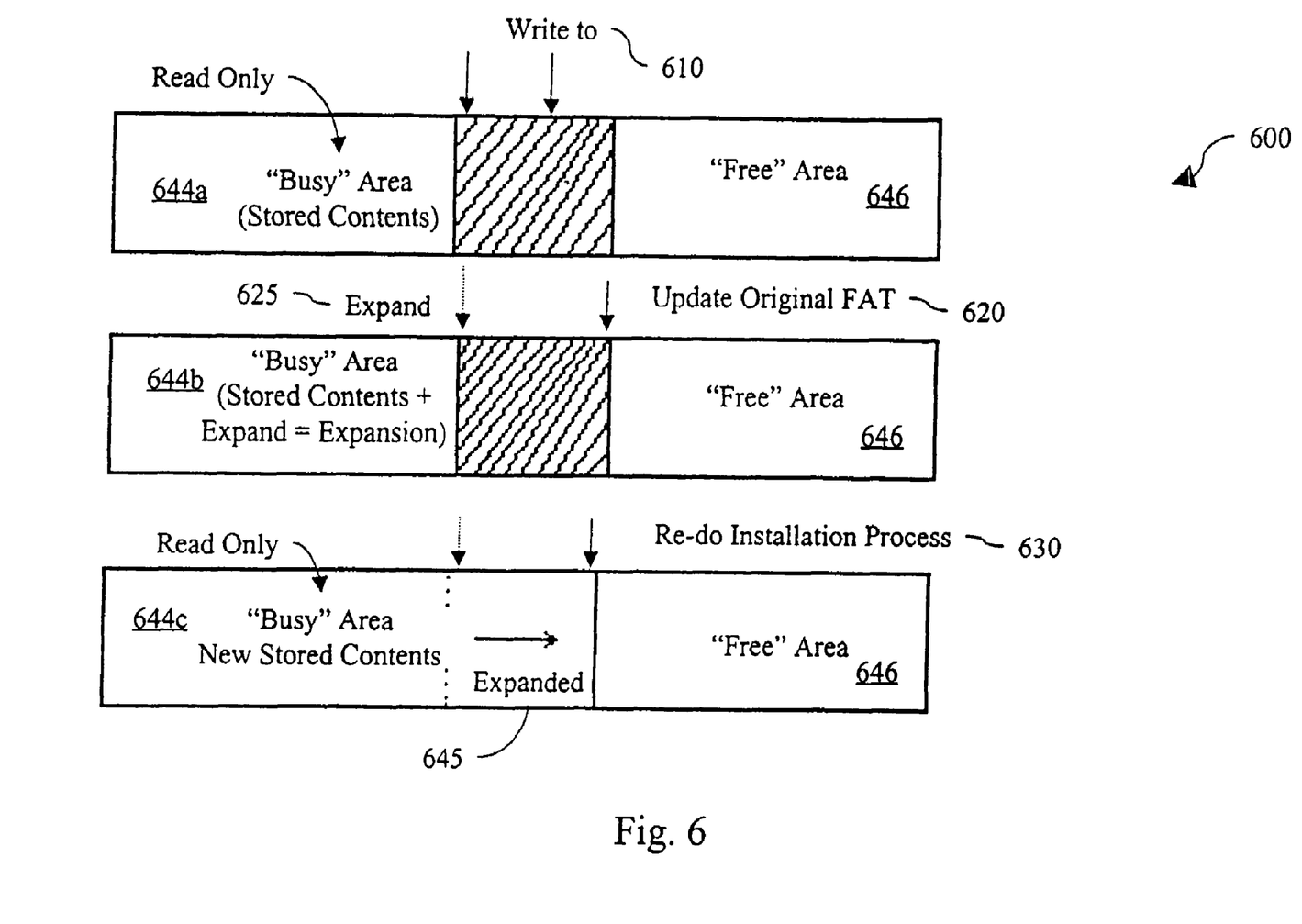
FIG. 6 is a system diagram illustrating an expand function performed in accordance with the invention that re-distributes space within a hard disk.

FIG. 6 is a system diagram illustrating an expand function 600 performed in accordance with the invention that redistributes space within a hard disk. The hard disk is initially depicted with a "busy" area 644*a* and a "free" area 646. The "busy" area 644*a* contains stored contents within the hard disk. The "busy" area 644*a* is also a read only portion of the hard disk. A "write to" command 610 is executed to the hard disk. Originally, the area of the hard disk to which the "write to" command 610 is executed is contained within the "free" area 646.

After an "expand" command 625 is executed, that area of the hard disk to which the "write to" command 610 has been executed is then contained within a "busy" area 644*c* of the hard disk. At this time, the area of the hard disk to which the "write to" command 610 has been executed is protected. After the "write to" command 610 is executed, the original file allocation table (FAT) of the hard disk is updated as shown by the command 620. During the time that the "expand" command 625 is being performed, the area of the hard disk to which the "write to" command 610 has been executed is not, but it is protected immediately thereafter as it is now located within the "busy" area 644*c* of the hard disk.

During the execution of the "expand" command 625, the hard disk is depicted as having a "busy" area 644*b* and the "free" area 646. Here, the "busy" area 644*b* contains the previously store contents as shown by the "busy" area 644*a* as well as any portion of the hard disk that is reclaimed during the execution of the "expand" command 625. The "free" area 646 is unchanged at this point. Subsequently, the installation process is repeated as shown by the command 630. The hard disk is then depicted as having the "busy" area 644*c* (as described above including the area of the hard disk to which the "write to" command 610 has been executed) and the "free" area 646. After an "expand" command 625 is executed, that area of the hard disk to which the "write to" command 610 has been executed is then contained within the "busy" area 644*c* of the hard disk. At this time, the area of the hard disk to which the "write to" command 610 has been executed is fully protected. After the "write to" command 610 is executed, the original file allocation table (FAT) of the hard disk is updated as shown by the command 620.

The "busy" area 644*c* contains the newly stored contents within the hard disk that have been acquired during the execution of the expand command 625. The "busy" area 644*c* is also a read only portion of the hard disk. Shown also is the expanded area 645 of the hard disk. The "free" area 646 is still unchanged at this point.

Figure 7:
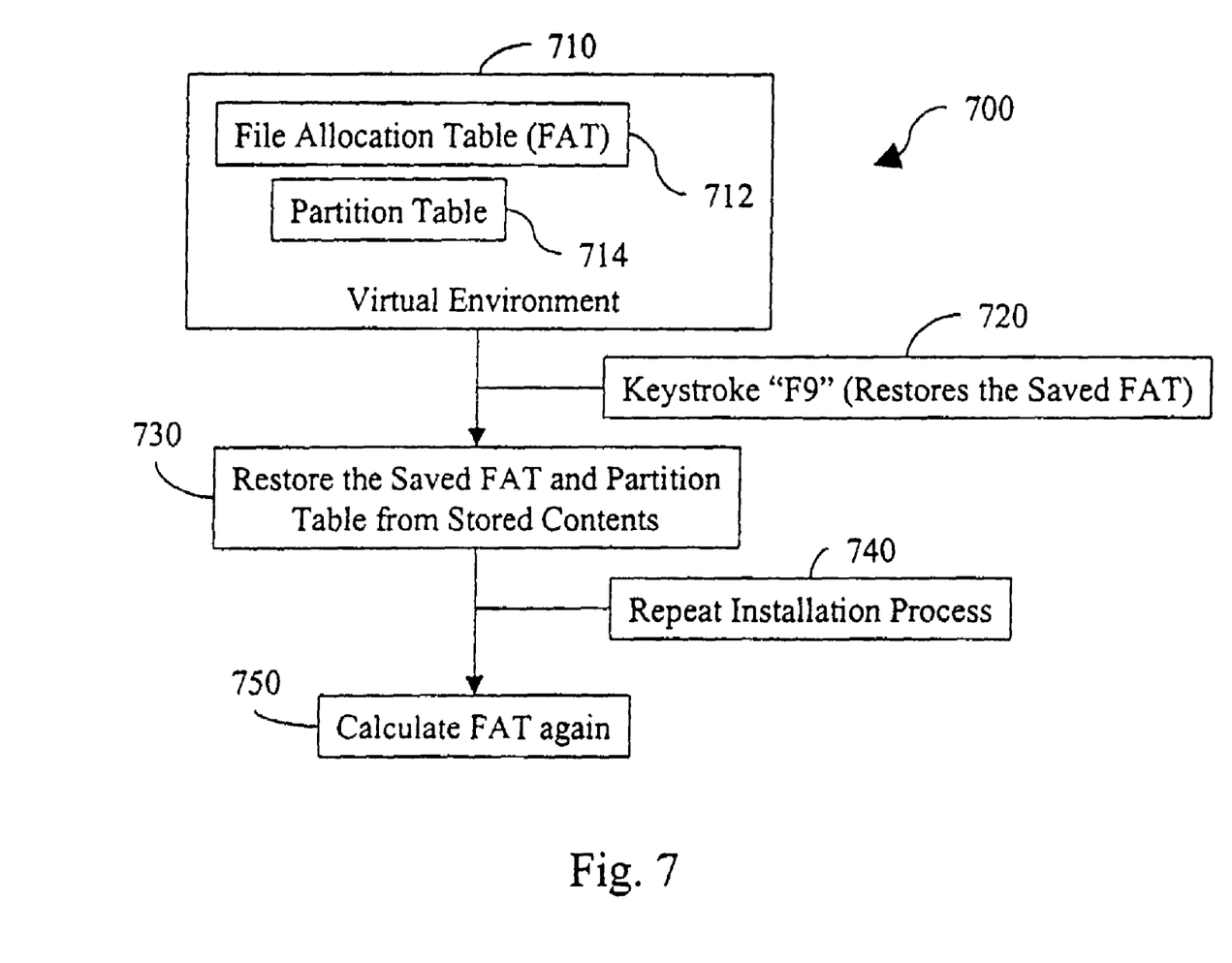
FIG. 7 is a system diagram illustrating a recovery function performed in accordance with the invention.

FIG. 7 is a functional block diagram illustrating a recovery function 700 performed in accordance with the invention. The recovery function 700 is performed in a virtual environment 710. The virtual environment 710 itself contains, among other things, a file allocation table (FAT) 712 and a partition table 714. Subsequently, as shown by the block 720, a button on computing system on which the recovery function 700 is performed is depressed to restore the saved file allocation table (FAT). In this particular embodiment of the invention, the keystroke of "F9" is shown in the block 720 to restore the saved file allocation table (FAT). Any button or keystroke is implemented in other embodiments of the invention to perform the function of the block 720 without departing from the scope and spirit of the invention. Subsequently, as shown in the block 730, the saved file allocation table (FAT) and the partition table are restored from the stored contents within a hard disk of the computing system. In a block 740, the re-installation of the program is performed again. Finally, in a block 750, the file allocation table (FAT) is calculated.

While the above detailed description has shown, described, and pointed out novel features of the invention as applied to various embodiments, it will be understood that various omissions, substitutions, and changes in the form and details of the device or process illustrated may be made by those of ordinary skill in the technology without departing from the spirit of the invention. This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method of accessing data in locations of a memory in a computer system, the method comprising:
    receiving a write access command addressed to a first location;
    determining whether said first location is identified as protected, wherein a memory location that is protected cannot be overwritten by said computer system without intervention by a user of the computer system to unprotect the memory location;
    if said first location is identified as protected, determining a second location that is identified as not protected, wherein a memory location that is not protected can be overwritten by said computer system;
    directing the write access command to said second location;
    receiving a subsequent write access command addressed to said first location; and
    directing said subsequent write access command to a third location that is identified as not protected.

2. The method of claim 1, further comprising:
    receiving at least one read access command directed to said first location; and
    directing said at least one read access command to said third location.

3. The method of claim 2, wherein determining a second location that is identified as not protected further comprises determining a second location that is identified as available.

4. The method of claim 3, wherein said third location is identified as available.

5. The method of claim 2, wherein said memory is a disk drive.

6. The method of claim 5, wherein said first, second, and third locations are sectors.

7. The method of claim 1, wherein determining a second location that is identified as not protected further comprises determining a second location that is identified as available.

8. The method of claim 7, wherein said third location is identified as available.

9. The method of claim 1, wherein said memory is a disk drive and said first, second, and third locations are sectors.

10. The method of claim 1, further comprising protecting said second location.

11. The method of claim 10, further comprising protecting said third location.

12. The method of claim 1, wherein determining whether said first, second, and third locations are protected or non-protected is performed by a device driver configured to intercept accesses to a memory subsystem of said computer system.

13. The method of claim 12, wherein said memory subsystem includes at least one disk drive.

14. The method of claim 1, wherein said directing the write access command to said second location and said directing said subsequent write access command to said third location is performed by a device driver configured to intercept accesses to a memory subsystem of said computer system.

15. The method of claim 1, further comprising creating a virtual file allocation table corresponding to at least a portion of a memory subsystem of said computer system, wherein said table includes information indicating memory locations that are protected and memory locations that are not protected.

16. The method of claim 1, wherein prior to said receiving said write access command:
    said first location was not protected, was written to, and, after being written to, was specified as being protected.

17. The method of claim 1, wherein said first location was initially configured within said computer system as a protected memory location.

18. A computer system for accessing data in locations of a memory in a computer system, the computer system comprising:
    a driver configured to:
        receive a write access command addressed to a first location;
        determine whether said first location is identified as protected, wherein a memory location that is protected cannot be overwritten by said computer system without intervention by a user of the computer system to unprotect the memory location;
        if said first location is identified as protected, determine a second location that is identified as not protected, wherein a memory location that is not protected can be overwritten by said computer system;
        direct the write access command to said second location;
        receive a subsequent write access command addressed to said first location; and
        direct said subsequent write access command to a third location that is identified as not protected.

19. The computer system of claim 18, wherein the driver being configured to determine a second location that is identified as not protected further comprises the driver being configured to determine a second location that is identified as available.

20. The computer system of claim 19, wherein the driver being configured to determine a third location that is identified as not protected further comprises the driver being configured to determine a third location that is identified as available.

21. The computer system of claim 18, wherein said memory is a disk drive.

22. The computer system of claim 21, wherein said first, second, and third locations are sectors.

23. The computer system of claim 18, wherein said driver is further configured to protect said second location.

24. The computer system of claim 23, wherein said driver is further configured to protect said third location.

25. The computer system of claim 18, wherein said driver is configured to intercept accesses to a memory subsystem of said computer system.

26. The computer system of claim 18, wherein said driver is configured to create a virtual file allocation table corresponding to at least a portion of a memory subsystem of said computer system, wherein said table includes information indicating memory locations that are protected and memory locations that are not protected.

27. A method of accessing and recovering data in locations of a memory in a computer system, the method comprising:
receiving a write access command addressed to a first location;
determining whether said first location is identified as protected, wherein a memory location that is protected cannot be overwritten by said computer system without intervention by a user of the computer system to unprotect the memory location;
if said first location is identified as protected, determining a new location that is identified as not protected, wherein a memory location that is not protected can be overwritten by said computer system;
directing the write access command to said new location;
receiving a read access command addressed to said first location;
directing the read access command to said new location; and
recovering to a restore point that includes said first location;
after said recovering, directing read access commands addressed to said first location to said first location.

28. The method of claim 27, further comprising:
receiving a second read access command directed to said first location; and
re-directing said second read access command to said first location.

29. The method of claim 27, wherein determining a new location that is identified as not protected further comprises determining a new location that is identified as available.

30. The method of claim 27, wherein said memory is a disk drive.

31. The method of claim 30, wherein said first, second, and third locations are sectors.

32. The method of claim 27, wherein prior to said receiving said write access command:
said first location was not protected, was written to, and, after being written to, was specified as being protected.

33. The method of claim 27, wherein said first location was initially configured within said computer system as a protected memory location.

34. A method of accessing data in memory locations in a computer system, the method comprising:
receiving a password from a user of said computer system;
if said password is validated, enabling said computer system to access said memory locations, including:
receiving a write access command addressed to a first location;
determining whether said first location is identified as protected, wherein a memory location that is protected cannot be overwritten by said computer system without intervention by a user of the computer system to unprotect the memory location;
if said first location is identified as protected, determining a second location that is identified as not protected, wherein a memory location that is not protected can be overwritten by said computer system;
directing the write access command to said second location;
receiving a subsequent write access command addressed to said first location; and
directing said subsequent write access command to a third location that is identified as not protected.

35. The method of claim 34, wherein if said password is not validated, disabling said computer system from accessing said memory locations.

36. The method of claim 34, wherein prior to said receiving said write access command:
said first location was not protected, was written to, and, after being written to, was specified as being protected.

37. The method of claim 34, wherein said first location was initially configured within said computer system as a protected memory location.

38. A computer system, comprising:
at least one disk drive, wherein said at least one disk drive includes protected and non-protected memory locations, wherein protected memory locations cannot be overwritten by said computer system without intervention by a user of the computer system to unprotect the memory locations, and wherein non-protected memory locations can be overwritten by said computer system;
a device driver configured to intercept accesses to said memory subsystem, determine whether said accesses are write access to protected memory locations, and direct said write accesses to protected memory locations to non-protected memory locations.

39. The computer system of claim 38, wherein said computer system is configured to change non-protected memory locations to protected memory locations.

40. The computer system of claim 39, wherein said device driver is configured to access a table including information indicative of whether memory locations are protected or non-protected, and wherein said computer system changing non-protected memory locations to protected memory locations includes said device driver updating said table.

41. The computer system of claim 38, wherein said computer system includes an operating system, wherein said device driver is transparent to said operating system.

42. The computer system of claim 38, wherein said computer system is configured to prevent accesses to said memory subsystem unless a user of said computer system enters a password and said computer system validates said password.

43. The computer system of claim 38, wherein said computer system is initialized with a base configuration, wherein said base configuration specifies memory locations that are protected.

44. The computer system of claim 43, wherein said base configuration corresponds to a state of the BIOS of said computer system.

45. The computer system of claim 43, wherein said computer system is not configured to change said base configuration.

46. The computer system of claim 43, wherein said computer system is configured to change said base configuration to a new configuration.

47. The computer system of claim 46, wherein said computer system is configured to check that said new configuration is operable.

48. The computer system of claim 43, wherein said computer system is configured to specify information indicative of a second configuration in addition to said base configuration.

49. The computer system of claim 38, wherein said device driver is configured to direct read accesses to memory locations for which previous write accesses have been directed.

50. A computer-readable medium configured to store instructions executable by a processor to:
receive a write access command addressed to a first memory location of a computer system;
determine whether said first location is identified as protected, wherein a memory location that is protected cannot be overwritten by said computer system without intervention by a user of the computer system to unprotect the memory location;
if said first location is identified as protected, determine a second location that is identified as not protected, wherein a memory location that is not protected can be overwritten by said computer system;
direct the write access command to said second location;
receive a subsequent write access command addressed to said first location; and
direct said subsequent write access command to a third location that is identified as not protected.

51. A method for performing data protection in a computer system, comprising:
scanning one or more disk drives of said computer system, wherein said one or more disk drives include protected and non-protected memory locations, wherein protected memory locations cannot be overwritten by said computer system without intervention by a user of the computer system to unprotect the memory locations, and wherein non-protected memory locations can be overwritten by said computer system;
using information about said one or more disk drives obtained from said scanning to create a data structure including information regarding whether memory locations in said one or more disk drives are protected or non-protected;
receiving a write access to said one or more disk drives, wherein said write access is received by a device driver that is transparent to an operating system of said computer system;
said device driver determining whether said received write access is to a protected memory location, wherein said determining includes referencing said data structure;
if said received write access is to a protected memory location, directing said write access to a non-protected memory location.

52. The method of claim 51, wherein said scanning includes determining information regarding sectors on said one or more disk drives.

53. The method of claim 51, wherein said scanning includes reading file allocation tables corresponding to said one or more disk drives.

54. The method of claim 51, wherein information obtained through said scanning is usable to determine a specific identification of at least one of said one or more disk drives.

55. The method of claim 54, wherein said information obtained through scanning includes information regarding corrupted and/or damaged portions of at least one of said one or more disk drives.

56. A computer system comprising:
a processor; and
a memory including program instructions executable to:
receive a write access command addressed to a first location;
determine whether said first location is identified as protected, wherein a memory location that is protected cannot be overwritten by said computer system without intervention by a user of the computer system to unprotect the memory location;
if said first location is identified as protected, determine a second location that is identified as not protected, wherein a memory location that is not protected can be overwritten by said computer system;
direct the write access command to said second location;
receive a subsequent write access command addressed to said first location; and
direct said subsequent write access command to a third location that is identified as not protected.

57. The computer system of claim 56, wherein prior to said receiving said write access command:
said first location was not protected, was written to, and, after being written to, was specified as being protected.

58. The computer system of claim 56, wherein said first location was initially configured within said computer system as a protected memory location.

* * * * *

UNITED STATES PATENT AND TRADEMARK OFFICE
CERTIFICATE OF CORRECTION

PATENT NO. : 7,313,726 B2
APPLICATION NO. : 10/920824
DATED : December 25, 2007
INVENTOR(S) : Shen et al.

It is certified that error appears in the above-identified patent and that said Letters Patent is hereby corrected as shown below:

In column 2, line 51, after "operations" insert -- . --.

In column 2, line 62, after "system" insert -- . --.

In column 12, line 26, in Claim 38, after "user of" delete "the" and insert -- said --, therefor.

In column 12, line 27, in Claim 38, before "memory locations," insert -- protected --.

In column 12, line 30, in Claim 38, delete "memory subsystem" and insert -- at least one disk drive --, therefor.

In column 12, line 48, in Claim 42, delete "memory subsystem" and insert -- at least one disk drive --, therefor.

In column 13, line 34, in Claim 51, after "user of" delete "the" and insert -- said --, therefor.

In column 13, line 35, in Claim 51, before "memory locations," insert -- protected --.

Signed and Sealed this

Ninth Day of December, 2008

JON W. DUDAS
*Director of the United States Patent and Trademark Office*